(12) United States Patent
Paull

(10) Patent No.: US 10,933,325 B1
(45) Date of Patent: Mar. 2, 2021

(54) REAL-TIME PLANETARY POSITION DEPENDENT ASTROLOGICAL GAME STATS

(71) Applicant: Timothy Paull, Parkland, FL (US)

(72) Inventor: Timothy Paull, Parkland, FL (US)

( * ) Notice: Subject to any disclaimer, the term of this patent is extended or adjusted under 35 U.S.C. 154(b) by 0 days.

(21) Appl. No.: 15/273,620

(22) Filed: Sep. 22, 2016

Related U.S. Application Data

(60) Provisional application No. 62/222,497, filed on Sep. 23, 2015.

(51) Int. Cl.
  *A63F 13/00* (2014.01)
  *A63F 13/58* (2014.01)
  *A63F 13/30* (2014.01)

(52) U.S. Cl.
  CPC .............. *A63F 13/58* (2014.09); *A63F 13/30* (2014.09)

(58) Field of Classification Search
  None
  See application file for complete search history.

(56) References Cited

PUBLICATIONS

Wayback Machine Internet Archieve, Sub-Games, Lucent Heart/ Tutorial, Jul. 9, 2014, 2 pages https://web.archive.org/web/20140815000000*/https://subagames.com/LucentHeart/Tutorial.aspx.*

* cited by examiner

*Primary Examiner* — Jay Trent Liddle
*Assistant Examiner* — Alex F. R. P. Rada, II
(74) *Attorney, Agent, or Firm* — John Rizvi; John Rizvi, P.A.—The Patent Professor

(57) ABSTRACT

A method of creating and modifying astrological game character stats is disclosed, the method comprising receiving user profile data from a social network, receiving real planetary position data relating to the user profile data and generating or updating game character stats based on the user profile data and the planetary position data.

13 Claims, 6 Drawing Sheets

REAL-TIME PLANETARY POSITION DEPENDENT ASTROLOGICAL GAME STATS

CROSS-REFERENCE TO RELATED APPLICATION

This application claims the benefit of U.S. Provisional Patent Application Ser. No. 62/222,497, filed Sep. 23, 2015, which is incorporated herein in its entirety.

FIELD OF THE INVENTION

The present invention relates generally to video games, and more particularly to a method of providing game character stats that are dependent on real-time planetary positions.

BACKGROUND OF THE INVENTION

Astrology is a fascinating study involving the movements and relative positions of celestial bodies, and in many cases, astrology includes interpretations of planetary influences on humans. Astrology is usually used by people to provide guidance, understanding of their lives, and in some cases, entertainment. As such, some video games may include astrological elements to appeal to astrology enthusiasts, or to give a game a spiritual flair. For example, "The Sims" includes selecting various astrological signs when creating a game character. As another example, the video game "Skyrim" allows a user to select various powers based on fictional star constellations.

Commonly, a role playing video game (also known as an RPG) prompts a player to generate or create a unique character. For example, starting a new game, a player may be prompted to choose or edit various character parameters that affect gameplay in some way. For example, choosing parameters that strengthen stealth skills may allow a character to sneak more effectively. As another example, choosing parameters that increase combat skills may allow a character to battle opponents more effectively. As yet another example, choosing a parameter that increases overall health of a character may provide the character with greater resistance in battle. Such parameters are commonly referred to as statistics or "stats", and may include selectable attributes or traits. It is common for a player to attempt to build a unique character that the player connects with and enjoys role playing in a provided game world. Further, common role playing video games provide gameplay that includes modifying a character's stats based on challenges, battles, rewards, quests or other in-game conditions.

However, common role playing games require improvements in stat generation or modification. For example, stat or character generation or modification methods in common role playing games are not at all linked to a player's actual identity or real world conditions, and as such, commonly generated characters lack a personal "fingerprint" that garners generally desire from a role-playing video game, especially from an astrologically motivated role playing game. For example, common role playing games merely offer a set of parameters that are selectable by a user. As another example, common role playing games As such, there exists a need for a role playing game that generates or modifies game characters and statistics based on a real identity of a player or real world conditions to produce more unique, personal and dynamic characters and gameplay.

SUMMARY OF THE INVENTION

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

According to embodiments of the present disclosure, method of providing game character statistics is disclosed, the method comprising receiving user profile data from a social network, receiving real planetary position data relating to the user profile data and generating game character statistics based on the user profile data and the planetary position data.

In another feature, the user profile data includes a birth date, birth location, and a time of birth.

In another feature, the planetary position data includes planetary positions at the time of a user's birth.

In another feature, the planetary position data includes angles between planets at the time of a user's birth.

In another feature, the method includes determining a metavalue of an angle between two planets.

In another feature, the method includes determining if the angle provides is a favorable or unfavorable metavalue.

In another feature, the angle is determined geocentrically.

In another feature, game character stats are generated based on angles between one or more Birth Planet positions.

In another feature, game character stats are modified based on angles between current real-time positions of planets and Birth Planets.

In another feature, the game character stats are time dependently modified.

In another feature, the game character stats are modified by a total value.

As another embodiment, disclosed is a system for providing game character stats that are dependent on celestial body positions, the system including one or more storage machines holding instructions executable by one or more logic machines to, generate a game character, the game character having game character stats, and modify the character stats according to current positions of celestial bodies.

In another aspect, the game character stats are generated according to a user profile of an existing social networking site, and according to positions of celestial bodies at a time of birth indicated in the user profile.

In another aspect, the instructions are further executable to:

modify the character stats according to an angle between at least two celestial bodies, the angle having a vertex.

In another aspect, the vertex is Earth, and the celestial bodies are celestial bodies of Earth's solar system.

In another aspect, if the angle is determined to be a favorable astrological aspect, the character stats are favorably modified.

In another aspect, if the angle is determined to be an unfavorable astrological aspect, the character stats are unfavorably modified.

In another aspect, if the angle is approximately 0 degrees, 30 degrees, 60 degrees, or 120 degrees the angle is determined being a favorable astrological aspect.

In another aspect, if the angle is approximately 45 degrees, 90 degrees, 150 degrees, or 180 degrees the angle is determined being an unfavorable astrological aspect.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the claimed subject matter will hereinafter be described in accordance with the appended drawings provided to illustrate and not to limit the scope of the claimed subject matter, where like designations denote like elements, and in which:

It is to be understood that like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 7:
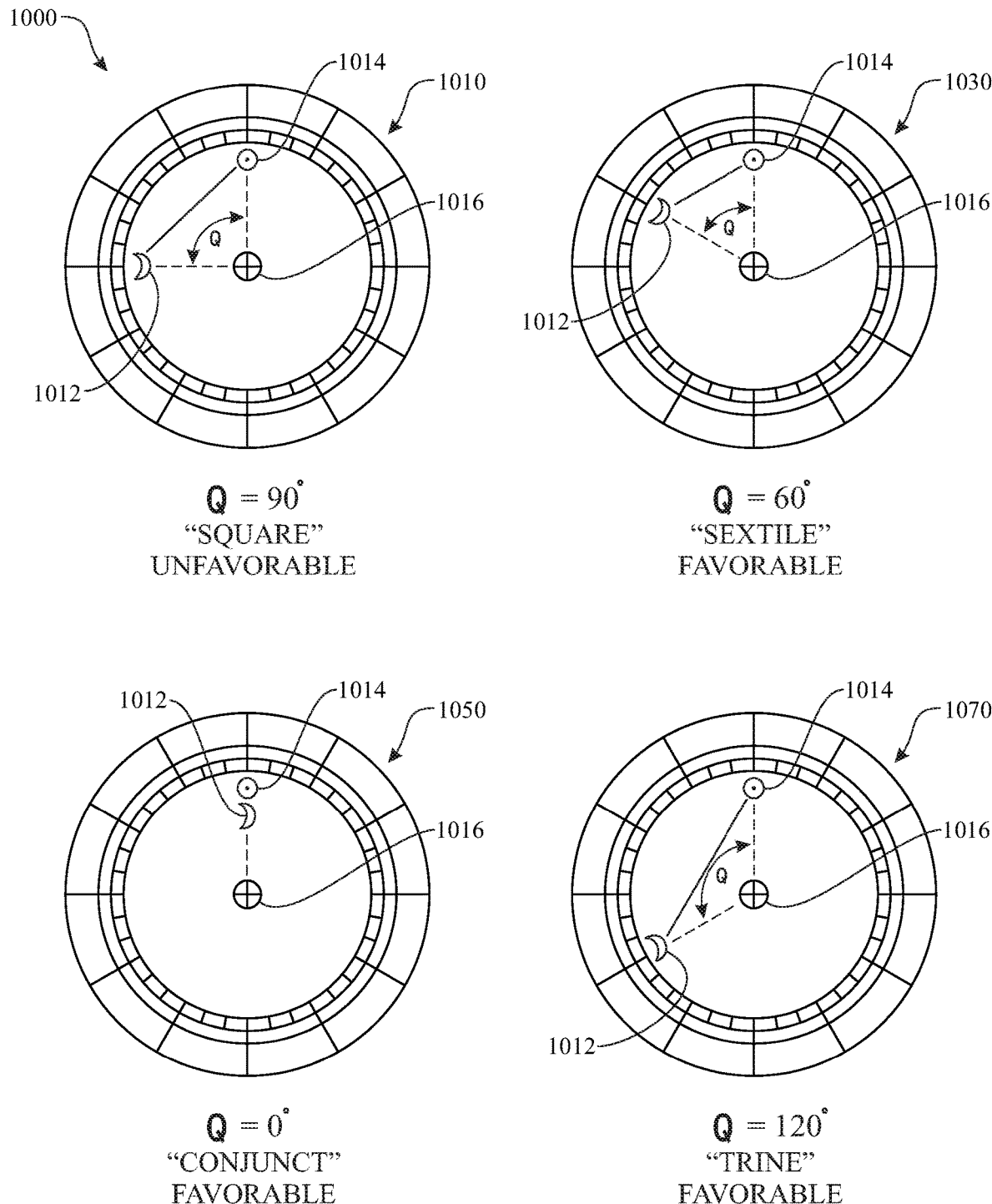
FIG. 7 schematically presents examples of planetary angles, in accordance with features of the present disclosure.

Disclosed is a method of providing game character stats that are dependent on real-time planetary positions. The method includes a series of sub methods or steps described in detail below. The illustration of FIG. 7 shows example charts 1000 showing various examples of angles between planets or celestial bodies, these angles being an important element of the present disclosure. More particularly charts 1000 are geocentric, with Earth 1016 being at the vertex of each angle, each angle formed between the first planet 1012 and the second planet 1014. It is to be understood that angles between any appropriate planet or celestial body may be used or included (e.g. Mercury, Venus, Mars, Jupiter, Saturn, Uranus, Neptune, Pluto). It is to be understood that any "planet" referred to herein may invariably be any celestial body of the universe or any celestial body of Earth's solar system. For example, the definition of "celestial body" may be a plain meaning of the term. Charts 1000 may be birth charts known in the art of astrology, including various houses and signs around a perimeter or circumference of each chart. For example, a birth chart includes planetary positions based on a location (e.g. city, country, and geocoordinates) of a subject person, and a time the person was born at that particular location. The charts 1000 may be in the form of tables, text or any appropriate form to provide data necessary for the below described methods. In some embodiments, real-time present day charts including astrological data or real planetary positions may be included or used in determining angles between planets. For example, the real-time geocentric planetary positions may be received from a database updated in real-time, which may include current data relating to planetary positions, or documented historical astrological data relating to planetary positions. For example, database 202 of FIG. 2 may be such a database. Database 202 may also provide predictions or anticipation of future planetary positions or charts. Although FIG. 7 shows a geocentric model, it is to be understood that any appropriate model may be used such as a heliocentric model.

First chart 1010 shows a 90 degree angle (theta) between first planet 1012 and second planet 1014, the angle also known as a "Square" type angle. Second chart 1030 shows a 60 degree angle between first planet 1012 and second planet 1014, the angle also known as a "Sextile" type angle. Third chart 1050 shows a 0 (zero) degree angle between first planet 1012 and second planet 1014, the angle also known as a "Conjunct" angle. Fourth chart 1070 shows a 120 degree angle between first planet 1012 and second planet 1014, the angle also known as a "Trine" type angle. Although not shown, other important angles may be identified, between the first planet 1012 and the second planet 1014. For example, other important angles may include Semi-Sextile (30 degrees), Semi-Square (45 degrees), and Opposition (180 degrees) type angles. It is to be understood that astrological terminology as used herein is for descriptive purposes, and in some embodiments such angle types (e.g. Square, Sextile, Conjunct, Trine) may be referred to by different terms or even sometimes ignored. For example, the angle types may be referred to as "Aspects", a term which will be used throughout this specification that is commonly found astrological studies and discussions. For example, a Birth Planet Aspect is an aspect for an associated angle between two planets at a person's birth time. Additionally or alternatively, each Aspect may have a range of associated angles. For example, a Square Aspect may include angles between 82 degrees and 98 degrees, having a swing of 8 degrees from 90 degrees. Such a swing may be referred to as an "orb" in the art of astrology. For example, an orb for a Conjunct Aspect may be 10 degrees, an orb for an Opposition Aspect may be 10 degrees, an orb for a Quincunx Aspect (150 degrees) may be 3 degrees, an orb for a Trine Aspect may be 6 degrees, an orb for a Square Aspect may be 8 degrees, an orb for a Sextile Aspect may be 4 degrees, an orb for a Semi-Square Aspect may be 2 degrees and an orb for a Semi-Sextile Aspect may be 2 degrees. It is to be understood that the angle variation or swing associated with the orbs may take any appropriate value. For example, a game designer may choose to have a flat set of 2 degree orbs for all Aspects. Alternatively, an orb's value may take values from traditional astrological literature. As such, the angles may generally benefit being referred to as Aspects, since a range of angles may be attributed to a particular Aspect or angle type. It is to be understood that a plurality of planets may be included in the charts 1000, and as such, a plurality of angles or Aspects for each planet may be determined. For example, one planet may have multiple Aspects, each of the multiple Aspects relating to an angle between the one planet and each of a plurality of other planets.

Additionally, current planet positions may be used to determine "Transit Planet" Aspects. For example, a Transit Planet Aspect may be an Aspect between a real-time current planet position and a past or historical Birth Planet position (i.e. a position of a planet at the time of a person's birth). In some cases, a Transit Planet may have an Aspect to its respective birth position, but in other cases, a Transit Planet Aspect may not include Aspects between Transit Planets and their respective birth position. Transit Planet Aspects may be determined by the same methods described above with respect to "birth" planet Aspects. Further, orbs for Transit Planet Aspects may be different from Birth Planet Aspects. For example, when a Transit Planet approaches another planet in a chart (during orbit), the orb or "swing" may be 1 degree, but when the same Transit Planet departs from another planet position, the orb may increase to 2 degrees. As such, as the planets rotate clockwise (or in some cases counter-clockwise) in a chart, their orbs may vary based on whether the planet is approaching or leaving another planet.

In astrology, these important angles or Aspects may also fall into two categories, Favorable Aspects (positive) or Unfavorable Aspects (negative), and for gameplay purposes such two categories may included in the disclosed method. For example, Favorable Aspects may be Conjunct, Semi-Sextile, Sextile, and Trine. On the other hand, Unfavorable Aspects may be Semi-Square. Square, Quincunx, and Opposition. Such Favorable or Unfavorable categorizations may follow astrological methods known in the art. Alternatively, such Favorable or Unfavorable categorizations may categorize any appropriate angle or Aspect for gameplay purposes. For example, ranges may be used to categorize Favorable or Unfavorable angles or Aspects. As another example, multiples or factors of 60 or 90 degrees may be used to determine Favorable or Unfavorable Aspects, respectively. In cases where multiple Aspects are associated or determined for a single planet, the multiple Aspects may include a number of distinctly Favorable and distinctly Unfavorable Aspects.

Figure 4:
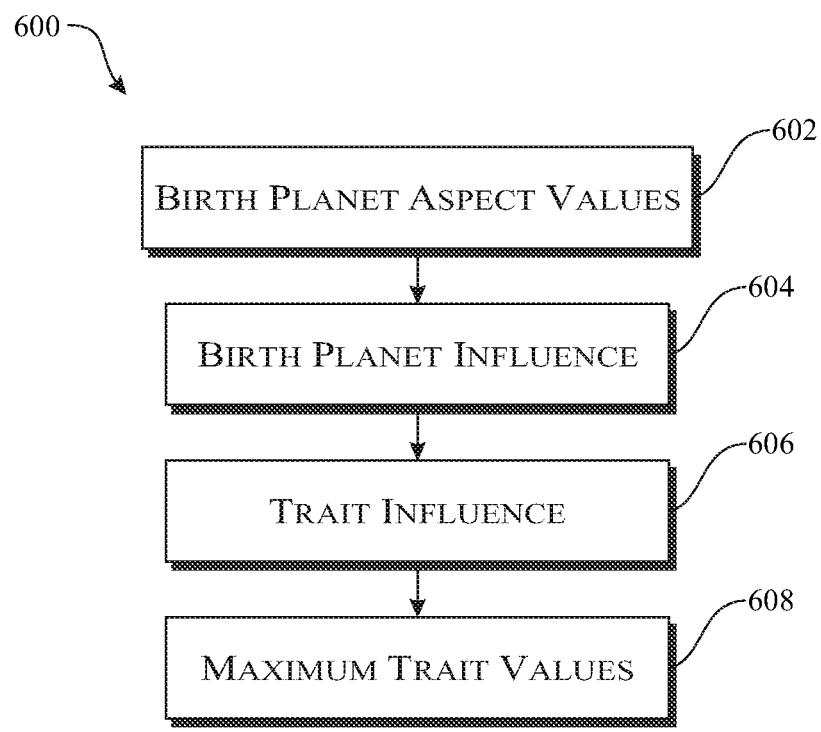
FIG. 4 schematically presents a method of generating maximum values of game character stats based on real planetary positions.

The herein described Aspects may be used in the disclosed method to determine stats (or statistics) of a role-playing game character. For example, FIG. 4 illustrates a method of determining or generating Maximum Trait Values of a character. A trait value may be similar to known stats in role playing games, such as strength, stamina, health, or magicka. In more creative instances, such as those described below, the stats may include intelligence, mood and/or power relating to an astrologically tuned game character.

Such stats may be determined per the following. Generally, method 600 of FIG. 4 includes, determining planet Aspect values (i.e. metavalues of the Aspects described above) and determining Maximum Trait Values based on the planet Aspect values. For example, at 602, the method may include assigning or determining an Aspect value (or metavalue) to each Aspect as described herein. More particularly, the various Aspects and associated degrees may be assigned Aspect values based on Table 1-1 included herein. It is to be understood that the aspect values disclosed herein may take any appropriate value. For example, a game designer may wish to assign higher or lower aspect values to certain aspects. Further, aspect values for the disclosed method may evolve or change based on progression of the disclosed methods or games (e.g. a higher level player may experience a different game based on an evolved set of aspect values for each aspect).

TABLE 1-1

|  | Birth Aspect Value | Transit Aspect Value |
|---|---|---|
| FAVORABLE | | |
| 0 Degrees | 3 | 3 |
| 120 Degrees | 2 | 2 |
| 60 Degrees | 1 | 1 |
| 30 Degrees | 1 | 1 |
| UNFAVORABLE | | |
| 180 Degrees | 2 | 3 |
| 90 Degrees | 3 | 4 |
| 150 Degrees | 1 | |
| 45 Degrees | 1 | |

Step 604 of method 600 may include determining a weight of how a Birth Planet influences character stats. The weight may be referred to herein as "Birth Planet Influence %". More particularly, a sum of all Aspect values for a particular Birth Planet may be divided by a sum of all Aspect values associated with all Birth Planets on a chart, providing the Birth Planet Influence %. For example Table 1-2 below is produced using the equation: (sum of all Aspect values for a Birth Planet)/(sum of all Birth Planet Aspect Values)=Birth Planet Influence %. In the example of Table 1-2, 1 Aspect values have been chosen for exemplary purposes, and it is to be understood that total Aspects for each Birth Planet will vary based on a person's birth time and location or birth chart as described above.

TABLE 1-2

|  | Total # of Aspects | Birth Planet Influence % |
|---|---|---|
| Birth Sun | 12 | 12.8% |
| Birth Moon | 4 | 4.3% |
| Birth Mercury | 11 | 11.7% |
| Birth Venus | 8 | 8.5% |
| Birth Mars | 9 | 9.6% |
| Birth Jupiter | 11 | 11.7% |
| Birth Saturn | 4 | 4.3% |
| Birth Uranus | 12 | 12.8% |
| Birth Neptune | 14 | 14.9% |
| Birth Pluto | 9 | 9.6% |
| Sum | 94 | 100.0% |

Further, in cases where traits are referred to as intelligence, mood and power, an individual Birth Planet may affect each of these traits based on a selected weight. For example, Table 1-3 shows examples of such weights. Such weights may be referred to herein as "Trait Influence". The values in Table 1-3 may be any appropriate value selected by a game designer. For example, a game designer may want the Sun to have a greater effect on the "intelligence" trait than on the "mood" and "power" traits, and select a high number weight for intelligence, and low number weights for mood and power.

In Table 1-3, "Balance Trait %" is a sum of all trait influence values for a specific trait (e.g. 9 for intelligence) divided by a total sum of all trait influence values of all traits. For example, referring to Table 1-3, for Intelligence: [Intelligence (9)]/[Total Sum (30)]=30%. Balanced trait % may be used in the "Maximum Trait Values" calculation as described throughout this specification.

TABLE 1-3

Planet Trait Influence

|  | Intelligence | Mood | Power | Total |
|---|---|---|---|---|
| Sun | 3 | 0 | 0 | 3 |
| Moon | 0 | 3 | 0 | 3 |
| Mercury | 1 | 1 | 1 | 3 |
| Venus | 2 | 0 | 1 | 3 |
| Mars | 1 | 0 | 2 | 3 |
| Jupiter | 0 | 2 | 1 | 3 |
| Saturn | 0 | 1 | 2 | 3 |
| Uranus | 1 | 1 | 1 | 3 |
| Neptune | 0 | 2 | 1 | 3 |
| Pluto | 1 | 1 | 1 | 3 |
| Sum | 9 | 11 | 10 | 30 |
| Balanced Trait % | 30.0% | 36.7% | 33.3% | |

Table 1-4 further describes determining a Trait Influence percentage, or "Trait Influence %". Values of the Trait Influence % may be determined via the following equation: [(Birth Planet Influence %)/(total number of traits)]*(Trait Influence) Trait Influence %. For example, the total number of traits for the traits Intelligence, Mood, and Power is three, since in this case there are three character traits. This step corresponds to element 606 of method 600 in FIG. 4. As such, the Trait Influence % provides a value that represents a total weight for each trait (e.g. in Table 1-4, the Trait Influence % sum is 32.4% for intelligence). For example, Trait Influence % relates to both Birth Planet Influence % and Trait Influence.

TABLE 1-4

Trait Influence %

|  | Intelligence | Mood | Power |
|---|---|---|---|
| Birth Sun | 12.8% | 0.0% | 0.0% |
| Birth Moon | 0.0% | 4.9% | 0.0% |
| Birth Mercury | 4.2% | 4.2% | 4.2% |
| Birth Venus | 5.8% | 0.0% | 2.9% |
| Birth Mars | 3.2% | 0.0% | 6.5% |
| Birth Jupiter | 0.0% | 7.8% | 3.9% |
| Birth Saturn | 0.0% | 1.3% | 2.6% |
| Birth Uranus | 4.2% | 4.2% | 4.7% |
| Birth Neptune | 0.0% | 9.7% | 4.9% |
| Birth Pluto | 3.7% | 3.2% | 3.2% |
| Trait Influence % Sum | 32.4% | 35.3% | 32.4% |

Step 608 of method 600 determines Maximum Trait Values. For example, step 608 may include the calculation: (Trait Influence %)/(Balanced Trait %)*(Level*N)=Maximum Trait Value, where N is an arbitrary game designer selected value per player level, and "level" is a level state of a player. For example, in a case where a player is "level 12" (e.g. representing level 12 of progress through a game), using the Trait Influence % sum values from Table 1-4, and using 30 as a value per player level, the equation produces: ((32.4%)/(30.0%))×(12*30)=388, where 388 is a determined Maximum Trait Value for intelligence. As such, Table 1-5 reproduces an example of results for this calculation of Maximum Trait Values (e.g. max intelligence value, max mood value, and max power value)

TABLE 1-5

|  | Value per Level |  | Intelligence | Mood | Power |
|---|---|---|---|---|---|
| (Trait Influence %)/(Balanced Trait %) |  |  | 108.0% | 96.2% | 97.3% |
| Level | 12 | 30 | 360 | 360 | 360 |
|  |  |  | 388 | 346 | 350 |

Figure 5:
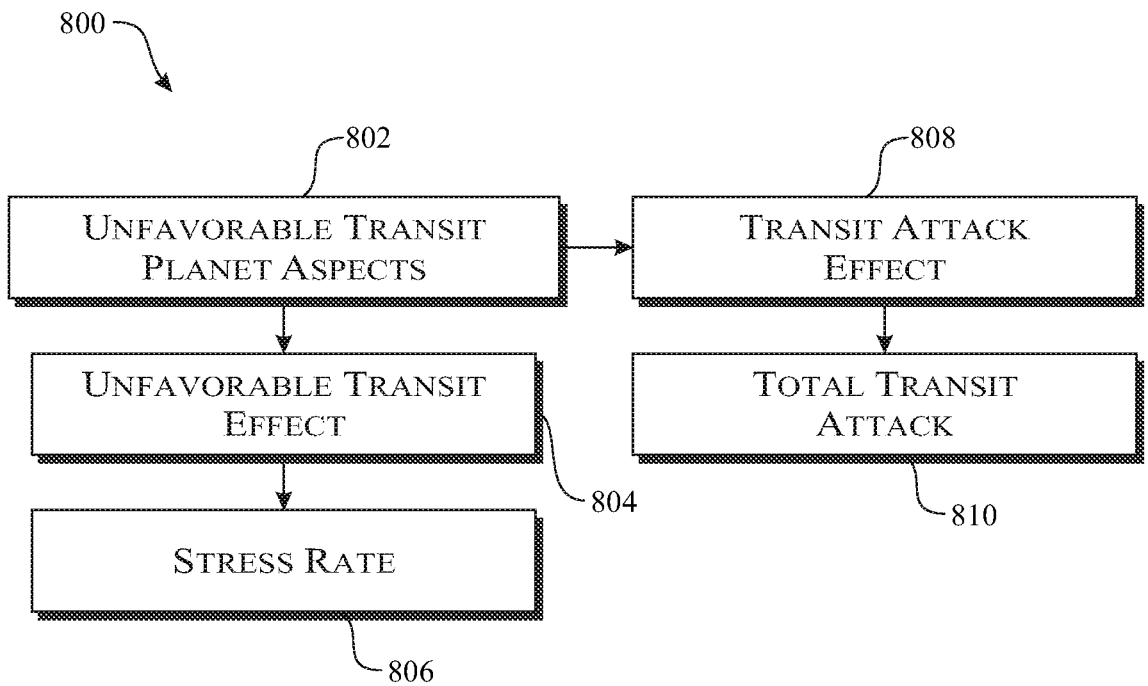
FIG. 5 schematically presents a method of generating negative stat modifiers based on real planetary positions, in accordance with features of the present disclosure.

The illustration of FIG. 5 shows method 800 producing or generating negative modifiers for modifying a player's stats (i.e. max trait values) negatively. More particularly, step 802 includes determining a number of Unfavorable (negative) Transit Aspect Values for a particular planet, which can be done by simply summing Unfavorable Transit Aspect Values for each planet. Determining Transit Aspect Values is described in more detail above. Further, step 804 includes determining an Unfavorable Transit Effect, where the Unfavorable Transit Effect is a value that determines a weight of how a Transit Planet negatively affects trait values. For example, the Unfavorable Transit Effect for each planet may be determined according to the following equation: [(Birth Planet Aspect Values for a particular planet)+(all Unfavorable Transit Aspect Values for the same planet)] (Birth Planet Aspect Values for the particular planet)=Unfavorable Transit Effect for the particular planet. Table 1-6 shows examples of resulting Unfavorable Transit Effect values for each Birth Planet and its respective Transit Planet.

TABLE 1-6

|  | All Birth Planet Aspect Values (from Table 1-2) | All Unfavorable Transit Planet Aspect Values | Transit Effect |
|---|---|---|---|
| Birth Sun | 12 | 0 | 100.0% |
| Birth Moon | 4 | 3 | 175.0% |
| Birth Mercury | 11 | 0 | 100.0% |
| Birth Venus | 8 | 2 | 125.0% |
| Birth Mars | 9 | 0 | 100.0% |
| Birth Jupiter | 11 | 4 | 136.4% |
| Birth Saturn | 4 | 2 | 150.0% |
| Birth Uranus | 12 | 2 | 116.7% |
| Birth Neptune | 14 | 0 | 100.0% |
| Birth Pluto | 9 | 4 | 144.4% |
| General Unfavorable Transit Effect (all planets) | 94 | 17 | 118.1% |

Step 806 includes determining a Stress Rate, a value which negatively impacts stat values per time. For example, to determine the Stress Rate, the following equation may be used, with results shown in Table 1-7: (Transit Effect Sum)−(Birth Planet Influence % sum)=daily Stress Rate, where "Birth Planet Influence % sum" is shown in Table 1-2 as 100% (in some cases the Birth Planet Influence % may not sum to 100%), and "Transit Effect Sum" is taken from Table 1-6. For example, the daily Stress Rate may decrease the characters stats as indicated in the row "decrease per day" in Table 1-7. It is to be understood that the rate may decrease a characters stats per hour, or any appropriate time period without departing from scope of this disclosure.

More particularly, in Table 1-7, the Transit Effect Sum is 118.1, the Birth Planet Influence % Sum is 100%, and their difference is the Daily Stress Rate, 18.1%. The Transit Intelligence Trait Influence %, Transit Mood Trait Influence %, and Transit Power Trait Influence % columns add up to a respective planet's Transit Planet Influence %, where all of the Transit Planet Influence % values add up to Transit Effect Sum, which in the case of Table 1-7 is 118.1. For example, the Transit Trait Influence % (e.g. for Intelligence, Mood, and Power respectively) values may be determined by applying the trait influence values of Table 1-3 to the Transit Planet Influence %. The sum of the Intelligence Trait Influence % column is 36.5%, the sum of the Mood Trait Influence % column is 43.6%, and the sum of the Power Trait Influence % is 37.9. The values for the Transit Intelligence Trait Influence %, Transit Mood Trait Influence %, and Transit Power Trait Influence % may be determined or calculated via the same method for calculating Trait Influence % in Table 1-4 above, but, instead of using the Birth Planet Aspect Values, Transit Aspect Values are used. Similarly, the Transit Planet Influence % is calculate in the same way as Birth Planet Influence % is calculated above, but instead of using Birth Planet Aspect Values, Transit Planet Aspect Values are used in the calculation.

To find the stress rate for each of these traits (e.g. for each of intelligence, mood, and power traits), the sum of the Trait Influence % column for each trait may be subtracted from the Transit Trait Influence %. For example, for the intelligence trait, subtracting 33.0% from 36.5% results in a Daily Stress Rate for Intelligence of 3.5%, meaning 3.5% of the Max Trait Value for Intelligence will be reduced by 3.5%. Therefore shown in Table 1-7 is the Decrease per Day of the Intelligence Trait being 13.58 which is approximately 3.5% of 388.

Attack Effect at step 810 of FIG. 5. For example, for Mercury, 36.4%*118.1%=42.9%=Mercury Transit Attack Effect. A modified trait % for each trait may be determined by multiplying the Transit Attack Effect by original Maximum Trait Values to determine a total lowering or reducing amount for each trait. For example, as shown in Table 1-8, the Maximum Trait Value of intelligence is to be reduced by 166.6 units, which is approximately 42.9% of the original value of 388. More particularly, Trait Influence % as shown in Table 1-4 may be taken into account to determine a modifier value for each trait. For example, for the intelligence Trait Influence of transit mercury, the following equation produces the intelligence trait % modifier (14.3%): [(Transit Planet Attack Effect)/(Number of Traits)]*(Intelligence weight from Table 1-3)=Intelligence Trait % Modifier. The solution is provided as follows: [42.9%/3]*1=14.3%=Intelligence Trait % Modifier. Results for calculations relating to step 808 are included and may be deducted herein in Table 1-8.

TABLE 1-8

|  | # of 90 & 180 Aspects | Transit Planet Attack % | Transit Planet Attack Effect | Intelligence Trait % Modifier | Mood Trait % Modifier | Power Trait % Modifier |
|---|---|---|---|---|---|---|
| Transit Sun | 0 | 0.0% | 0.0% | 0.0% | 0.0% | 0.0% |
| Transit Moon | 0 | 0.0% | 0.0% | 0.0% | 0.0% | 0.0% |
| Transit | 4 | 36.4% | 42.9% | 14.3% | 14.3% | 14.3% |

TABLE 1-7

|  | Transit planet Influence | Transit Intelligence Trait Influence | Transit Mood Trait influence | Transit Power Trait Influence |
|---|---|---|---|---|
| Birth Sun | 12.8% | 12.8% | 0.0% | 0.0% |
| Birth Moon | 7.4% | 0.0% | 7.4% | 0.0% |
| Birth Mercury | 11.7% | 3.9% | 3.9% | 3.9% |
| Birth Venus | 10.6% | 7.1% | 0.0% | 3.5% |
| Birth Mars | 9.6% | 3.2% | 0.0% | 6.4% |
| Birth Jupiter | 16.0% | 0.0% | 10.6% | 5.3% |
| Birth Saturn | 6.4% | 0.0% | 2.1% | 4.3% |
| Birth Uranus | 14.9% | 5.0% | 5.0% | 5.0% |
| Birth Neptune | 14.9% | 0.0% | 9.9% | 5.0% |
| Birth Pluto | 13.8% | 4.6% | 4.6% | 4.6% |
| Transit Effect Sum | 118.1% | Column Sum 36.5% | Column Sum 43.6% | Column Sum 37.9% |
| Birth Planet Influence % Sum | 100.0% | Trait Influence % | Trait Influence % | Trait Influence % |
| Daily Stress Rate (general) | 18.1% | 33.0% Daily Stress Rate (Intelligence) 3.5% | 34.8% Daily Stress Rate (Mood) 8.9% | 32.3% Daily Stress Rate (Power) 5.7% |
| Max Trait Value |  | 388 | 346 | 350 |
| Decrease per Day |  | 13.58 | 30.79 | 19.95 |

Another negative stat reduction method 800 includes step 808 which may determine a Transit Attack Effect, which reduces a player character's stats in a lump-sum fashion, where the stats are reduced in total. A Transit Attack Effect may be calculated by first solving the following equation: (sum of 90 and 180 degree Transit Aspect Values for each planet)/(sum of all transit Aspects for all planets)=Transit Planet Attack %. For example, for Mercury, the equation reads: (4)/(11)=36.4%=Transit Mercury Attack %. Furthermore, the Transit Planet Attack % may be multiplied by the Transit Effect Sum from Table 1-6 to produce the Transit TABLE 1-8-continued

|  | # of 90 & 180 Aspects | Transit Planet Attack % | Transit Planet Attack Effect | Intelligence Trait % Modifier | Mood Trait % Modifier | Power Trait % Modifier |
|---|---|---|---|---|---|---|
| Mercury Transit | 4 | 36.4% | 42.9% | 28.6% | 0.0% | 14.3% |
| Venus Transit | 0 | 0.0% | 0.0% | 0.0% | 0.0% | 0.0% |

TABLE 1-8-continued

| | # of 90 & 180 Aspects | Transit Planet Attack % | Transit Planet Attack Effect | Intelligence Trait % Modifier | Mood Trait % Modifier | Power Trait % Modifier |
|---|---|---|---|---|---|---|
| Mars Transit Jupiter | 0 | 0.0% | 0.0% | 0.0% | 0.0% | 0.0% |
| Transit Saturn | 0 | 0.0% | 0.0% | 0.0% | 0.0% | 0.0% |
| Transit Uranus | 0 | 0.0% | 0.0% | 0.0% | 0.0% | 0.0% |
| Transit Neptune | 3 | 27.3% | 32.2% | 0.0% | 21.5% | 10.7% |
| Transit Pluto | 0 | 0.0% | 0.0% | 0.0% | 0.0% | 0.0% |
| Total Transit Attack | 11 | 100.0% | | 42.9% | 35.8% | 39.4% |
| Max Trait Value | | 720 | | 388 | 346 | 350 |
| Attack Value | | 283.40 | | 166.45 | 123.87 | 137.9 |

Figure 6:
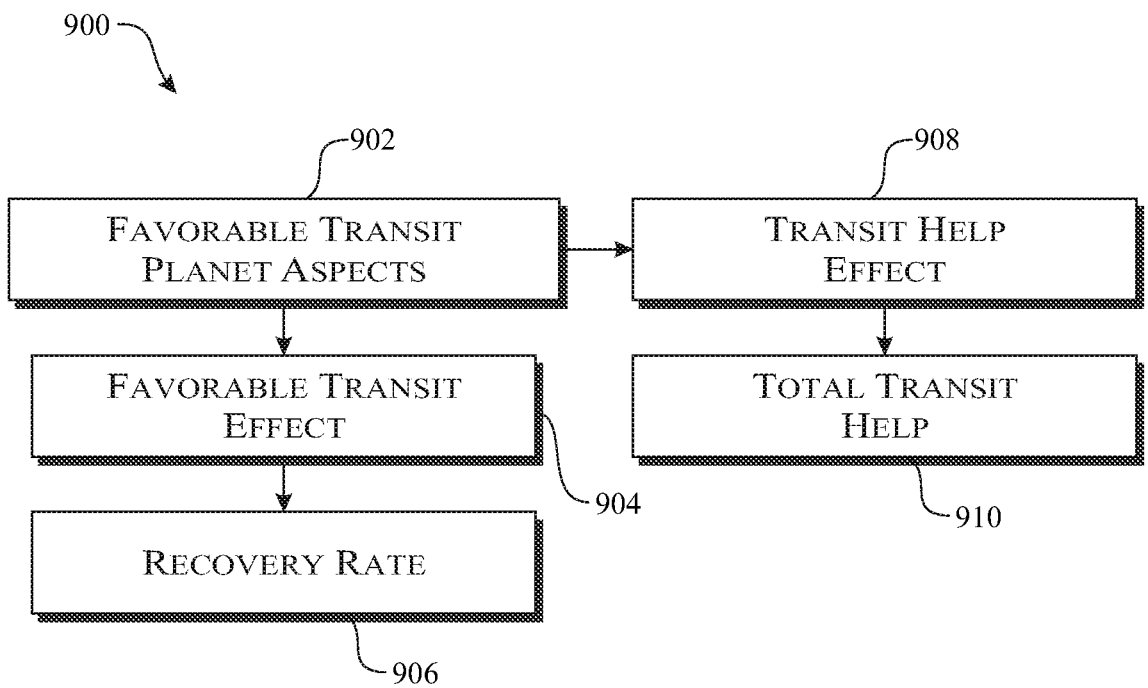
FIG. 6 schematically presents a method of generating positive stat modifiers based on real planetary positions, in accordance with features of the present disclosure.

Turning to FIG. 6, method 900 includes positively modifying character stats exactly as above, however instead of Unfavorable Aspects being used, Favorable Aspects may be used. As such, the methods for positively modifying character stats are identical except the method 900 substitutes Favorable Aspects for Unfavorable Aspects. For example, resulting from the same methods above, Favorable Aspects may produce a "Recovery Rate" instead of "Stress Rate", and a "Transit Planet Help" instead of "Transit Planet Attack". As such, a game character and their stats may be positively benefited from the Favorable Aspects when substituted into the methods above (in place of the Unfavorable Aspects) to positively affect or benefit character stats by increasing their values appropriately and respectively.

Figure 1:
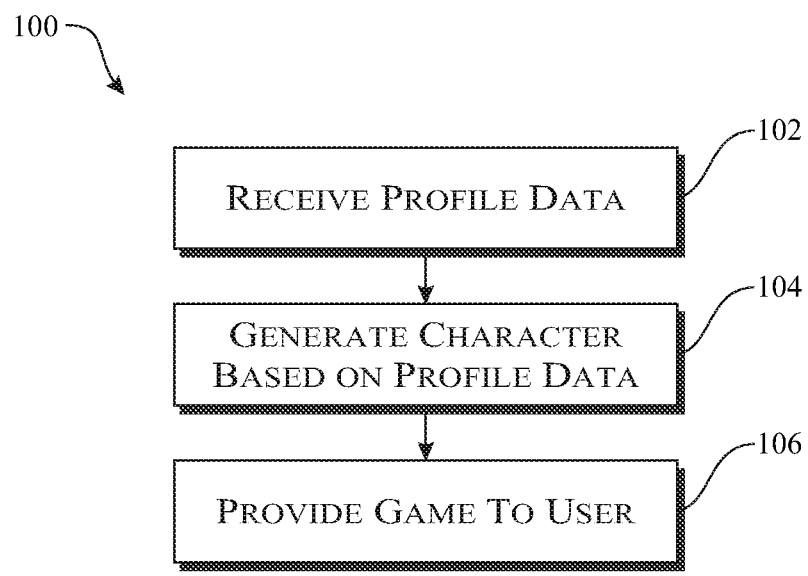
FIG. 1 schematically presents a method of generating a game character, in accordance with features of the present disclosure.
Figure 2:
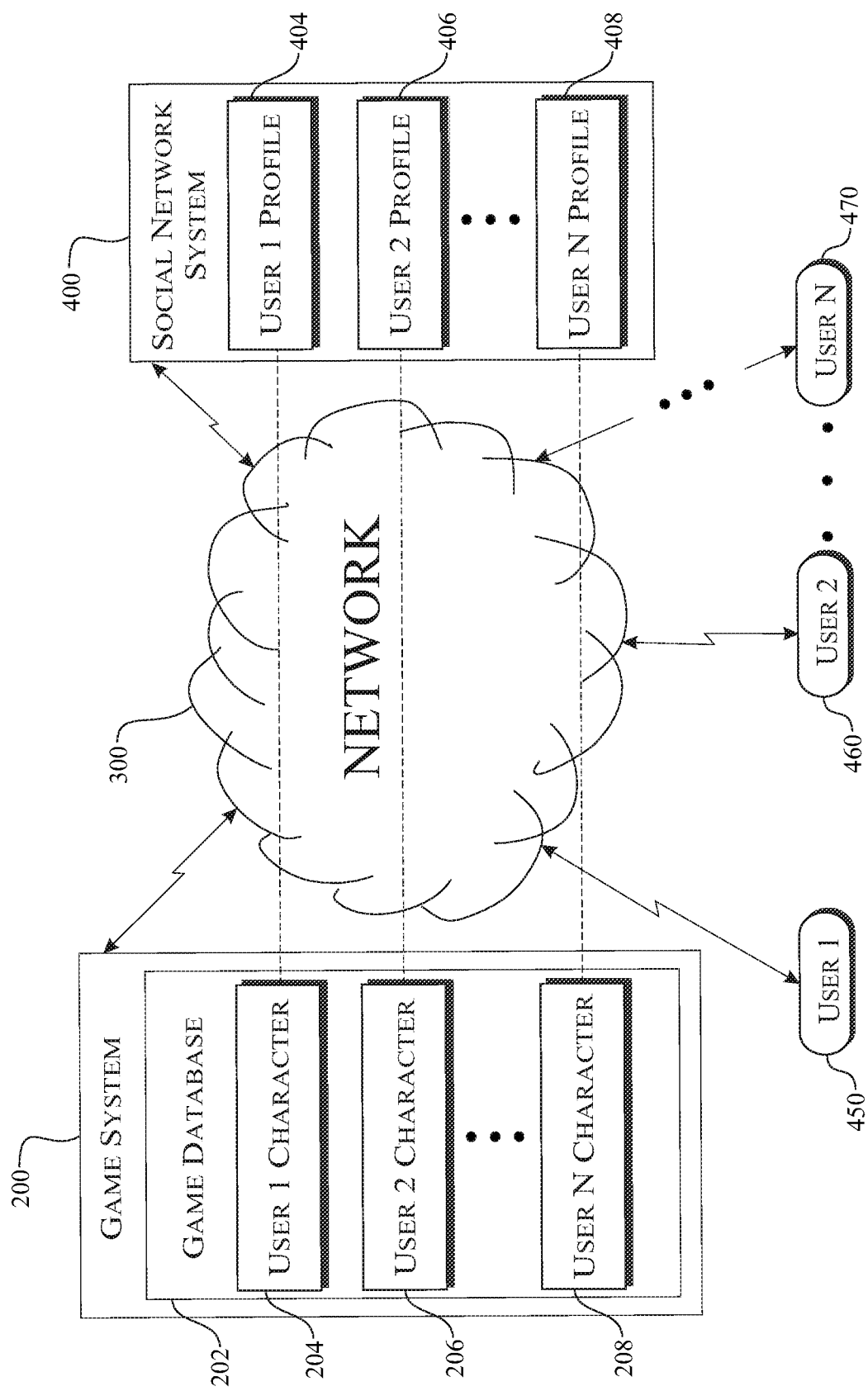
FIG. 2 schematically presents a network diagram, in accordance with features of the present disclosure.

FIG. 1 shows an example of method 100 for receiving profile data at 102, generating or updating a character based on the profile data at 104, and providing a game to a user at 106 such that the user may play the game with the generated character. First step 102 includes receiving profile data. For example, FIG. 2 shows game system 200 and/or database 202 receiving user profile data 404 from social network system 400 via network 300. User profile data 404 is profile data associated with user 450. For example, user profile data 404 may include data related to identity of the user 450. As such, user profile data 404 may include name, date of birth, time of birth and/or place of birth of user 450. Receiving the profile data may include first submitting a request to receive the profile data before receiving the profile data or transferring the profile data from the social network system 400 to the game system 200. For example, a user such as user 450 may submit a request to receive user profile data 404 via game system 200 or social network system 400. Turning back to FIG. 1, step 104 includes generating a character based on profile data. For example, the game system 200 may receive the user profile data 404 and generate or modify a character and character stats based on the user's profile data 404 as described via the methods above. Step 104 is described in more detail above, with respect to FIGS. 4-7. For example, a character may be generated having the stats described above, and the generated character's stats may be modified in real-time based on real-time planetary positions provided by database 202 or game system 200. In other embodiments, it is anticipated that the game system 200 may provide a prompt or a drop-down menu configured for receiving a user input to select a birth city, geographic coordinates, birth date, or other personal birth data such as birth time. Further, the prompt or drop-down menu may be configured for receiving a user input to select a general birth time, (i.e. morning, afternoon, evening, night, etc.) for users who are not able to indicate a specific birth time.

Figure 3:
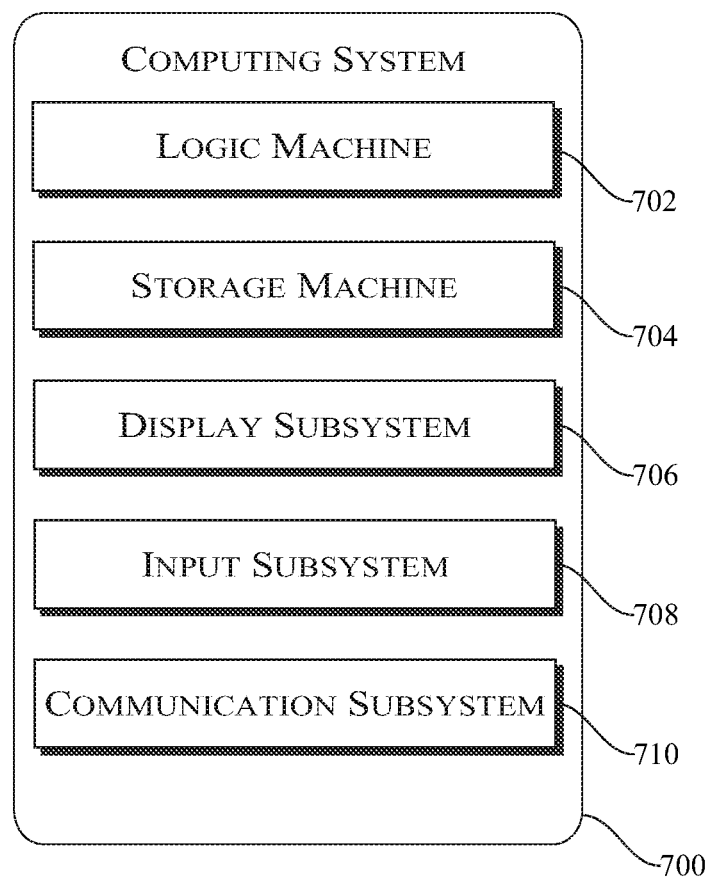
FIG. 3 schematically presents a computing system, in accordance with features of the present disclosure.

It is to be understood that game system 200, database 202, social network system 400, and/or users 450, 460 and/or 470 may include a computing system as described below with respect to FIG. 3 to provide the disclosed methods to users or players.

Step 106 includes providing a game to a user. For example, a user may begin playing a video game using a generated character from step 104 via a computing device. The game may be provided as streaming or cloud gaming, or via a disc or installation file as known in the art. An example of gameplay may include various quests, tasks, challenges via single or multi player gameplay. As another example, two players each having different profiles on the social network system 400 (i.e. user 1 profile 404 and user 2 profile 406) may battle one another or engage in cooperative gameplay involving the disclosed methods.

It is to be understood that the above described tables, calculations, numbers, and values thereof are included as non-limiting examples and any numbers or values may be appropriately included. For example, the various calculations above may be expressed as functions having variables which may take values that depend on planetary positions, or values selected by a game designer to achieve a desired gameplay effect. Further, the tables may be considered independently to understand the invention. Any of the values in the above described tables and calculations may not necessarily be taken from a preceding table or calculation, and are shown in each table as examples.

In some embodiments the methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. For example, a suitable computing system may be computing system 700 shown in FIG. 3. When such methods and processes are implemented, the state of the storage machine 704 may be changed to hold different data. For example, the storage machine 704 may include memory devices such as various hard disk drives, CD, or DVD devices. The logic machine 702 may execute machine-readable instructions via one or more physical information and/or logic processing devices. For example, the logic machine 702 may be configured to execute instructions to perform tasks for a computer program. The logic machine 702 may include one or more processors to execute the machine-readable instructions. The computing system 700 may include a display subsystem 706 to display a graphical user interface (GUI) or any visual element of the methods or processes described above. For example, the display subsystem 706, storage machine 704, and logic machine 702 may be integrated such that the above method may be executed while visual elements of the disclosed system and/or method are displayed on a display screen for user consumption. The computing system 700 may include an input subsystem 708 that receives user input. The input subsystem 708 may be configured to connect to and receive input from devices such as a mouse, keyboard or gaming controller. For example, a user input may indicate a request that certain task is to be executed by the computing system 700, such as requesting the computing system 700 to display any of the above described information, or requesting that the user input updates or modifies existing stored information for processing. A communication subsystem 710 may allow the methods described above to be executed or provided over a computer network. For example, the communication subsystem 710 may be configured to enable the computing system 700 to communicate with a plurality of personal computing devices. The communication subsystem 710 may include wired and/or wireless communication devices to facilitate networked communication. The described methods or processes may be executed, provided, or implemented for a user or one or more computing devices via a computer-program product such as via an application programming interface (API).

In conclusion, provided is a method of updating and creating an astrological role-playing game character, where the character creation reflects a user's true social media profile data and real astrological birth data to produce a unique, astrologically based character which the user may connect with emotionally and personally. Further, provided is a method of updating the astrological role-playing game character's stats such that the stats are in tune with real-time planetary positions, providing a dynamic, personal experience to a user or player.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A computer game system for providing computer game character stats that are dependent on celestial body positions, the computer game system including one or more storage machines holding instructions executable by one or more logic machines to:
   generate a game character, the game character having game character stats;
   at a GUI, display the game character and the game character stats;
   using one or more logic machines, determine an angle between at least two real celestial bodies based on planetary position data updates received from a database machine;
   using the one or more logic machines, modify the game character stats based on the determined angle, modifying the game character stats resulting in modified game character stats; and
   at the GUI, display the modified game character stats;
   wherein the one or more logic machines determine if the angle is a favorable astrological aspect, and if the angle is determined to be a favorable astrological aspect, the character stats are favorably modified by the one or more logic machines;
   wherein the one or more logic machines determine if the angle is an unfavorable astrological aspect, and if the angle is determined to be an unfavorable astrological aspect, the character stats are unfavorably modified by the one or more logic machines;
   wherein modifying the game character stats favorably include increasing the character's defensive or offensive abilities for facing challenges; and
   wherein modifying the game character stats unfavorably include decreasing the character's defensive or offensive abilities for facing challenges.

2. The computer game system of claim 1, wherein the game character stats are generated according to a user profile of an existing social networking site, and according to positions of celestial bodies at a time of birth indicated in the user profile.

3. The computer game system of claim 1, wherein the angle has a vertex, and the vertex is Earth, and the celestial bodies are celestial bodies of Earth's solar system.

4. The computer game system of claim 1, wherein if the angle is approximately 0 degrees, 30 degrees, 60 degrees, or 120 degrees the angle is determined being a favorable astrological aspect.

5. The computer game system of claim 1, wherein if the angle is approximately 45 degrees, 90 degrees, 150 degrees, or 180 degrees the angle is determined being an unfavorable astrological aspect.

6. A computer game system for providing computer game character stats that are dependent on celestial body positions, the computer game system including one or more storage machines holding instructions executable by one or more logic machines to:
   generate a game character, the game character having game character stats;
   modify the character stats according to real-time positions of celestial bodies, the real-time positions being actual positions of the celestial bodies updated in real-time at a database storage machine such that the character stats are modified in real-time during gameplaying the game character according to the real-time positions of the celestial bodies; and
   modify the character stats according to a real-time angle between at least two celestial bodies, the real-time angle having a vertex;
   wherein if the real-time angle is determined to be a favorable astrological aspect, the character stats are favorably modified;
   wherein if the real-time angle is determined to be an unfavorable astrological aspect, the character stats are unfavorably modified; and
   wherein modifying the game character stats favorably include increasing the character's defensive or offensive abilities for facing challenges; and
   wherein modifying the game character stats unfavorably include decreasing the character's defensive or offensive abilities for facing challenges.

7. The computer game system of claim 6, wherein the game character stats are generated according to a user profile of an existing social networking site, and according to positions of celestial bodies at a time of birth indicated in the user profile.

8. The computer game system of claim 6, wherein the vertex is Earth, and the celestial bodies are celestial bodies of Earth's solar system.

9. The computer game system of claim 6, wherein if the real-time angle is approximately 0 degrees, 30 degrees, 60 degrees, or 120 degrees the real-time angle is determined being a favorable astrological aspect.

10. The computer game system of claim 6, wherein if the real-time angle is approximately 45 degrees, 90 degrees, 150 degrees, or 180 degrees the real-time angle is determined being an unfavorable astrological aspect.

11. A computer game system for providing computer game character stats that are dependent on celestial body positions, the computer game system including one or more storage machines holding instructions executable by one or more logic machines to:
   generate a game character, the game character having game character stats;

modify the character stats according to real-time positions of celestial bodies, the real-time positions being actual positions of the celestial bodies updated in real-time at a database storage machine such that the character stats are modified in real-time during gameplaying the game character according to the real-time positions of the celestial bodies;

modify the character stats according to a real-time angle between at least two celestial bodies, the real-time angle having a vertex;

wherein the game character stats are generated according to a user profile of an existing social networking site, and according to positions of celestial bodies at a time of birth indicated in the user profile; and wherein the vertex is Earth, and the celestial bodies are celestial bodies of Earth's solar system;

wherein if the real-time angle is determined to be a favorable astrological aspect, the character stats are favorably modified;

wherein if the real-time angle is determined to be an unfavorable astrological aspect, the character stats are unfavorably modified; and wherein modifying the game character stats favorably include increasing the character's defensive or offensive abilities for facing challenges; and wherein modifying the game character stats unfavorably include decreasing the character's defensive or offensive abilities for facing challenges.

12. The computer game system of claim 11, wherein if the real-time angle is approximately 0 degrees, 30 degrees, 60 degrees, or 120 degrees the real-time angle is determined being a favorable astrological aspect.

13. The computer game system of claim 11, wherein if the real-time angle is approximately 45 degrees, 90 degrees, 150 degrees, or 180 degrees the real-time angle is determined being an unfavorable astrological aspect.

* * * * *